Patented June 7, 1938

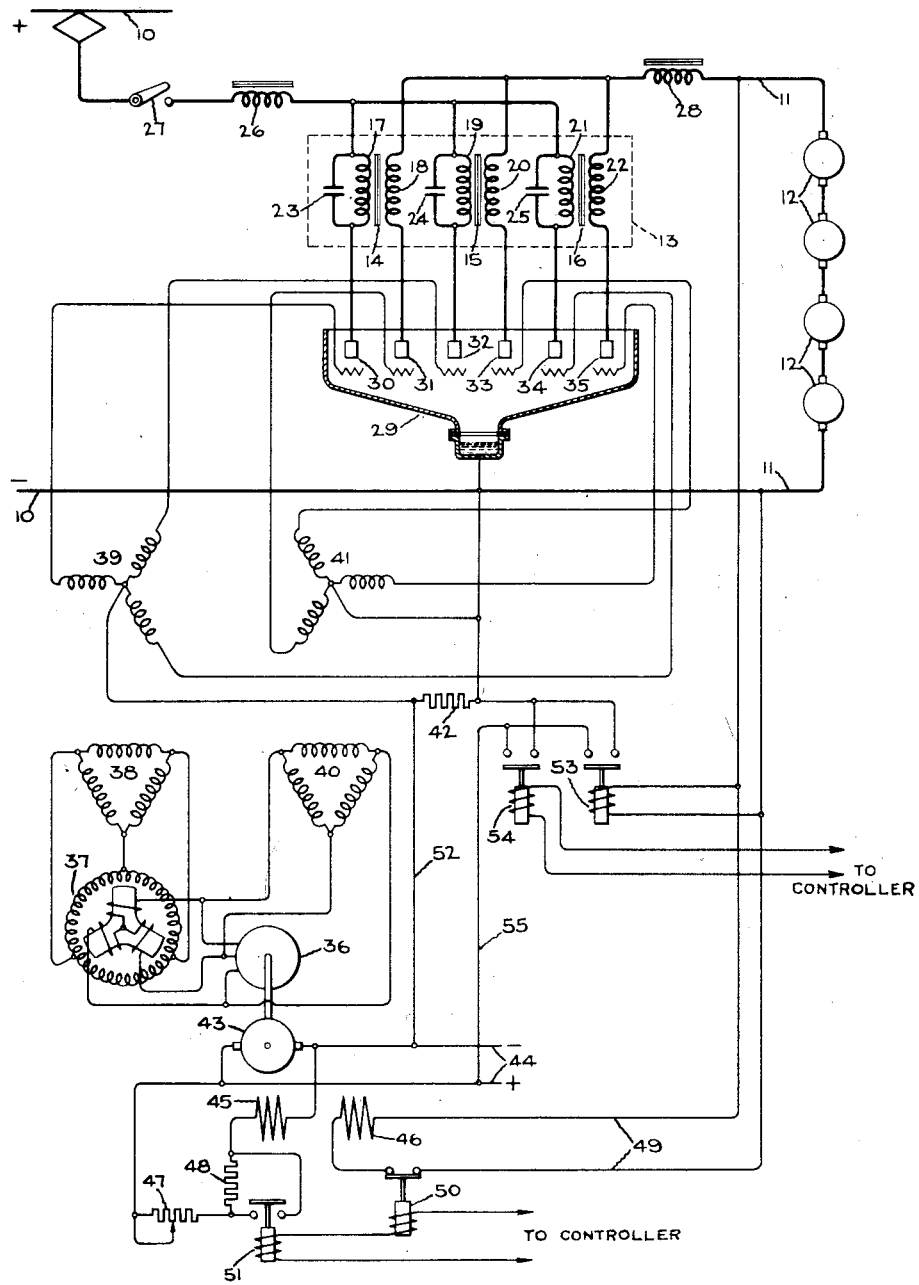

2,120,097

UNITED STATES PATENT OFFICE 2,120,097

ELECTRIC VALVE CONVERTING SYSTEM

Carl C. Herskind, Scotia, N. Y., assignor to General Electric Company, a corporation of New York Application March 20, 1937, Serial No. 132,152

10 Claims. (Cl. 171—97)

My invention relates to electric valve converting systems and more particularly to such systems suitable for transmitting energy between direct current circuits, one of which has a constant current characteristic.

An electric valve converting system suitable for transferring energy between direct current circuits, one of which has a constant current characteristic, is disclosed in United States Letters Patent 1,961,080, granted May 29, 1934 upon the application of Camil A. Sabbah, for improvements in Electric valve converting systems. Such systems utilize an energy storage and transfer device comprising a multi-legged reactor provided with a single inductive winding on each leg thereof, and having associated capacitors each connected across at least a portion of said inductive windings to maintain the total magnetomotive force of the core structure and that of each leg substantially constant. In my copending application Serial No. 89,599, filed July 8, 1936, there are disclosed numerous improved electric valve converting systems of this type in which the multi-legged reactor is provided with a plurality of inductive windings on each leg thereof, and in which one winding of each leg is provided with an associated capacitor.

In certain instances where the constant current circuit supplies energy to an inductive load, such as for instance that provided by a plurality of electric motors, it is desirable to provide the electric valve converting system with a suitable control circuit which will permit obtaining certain desired operating characteristics. Such an arrangement would be particularly desirable where an electric locomotive having a plurality of motors is to be operated from a high voltage direct current trolley.

It is, therefore, an object of my invention to provide an improved electric valve converting system for transferring energy between two direct current circuits which will overcome certain limitations of the arrangements of the prior art, and which will be simple and reliable in operation.

It is a further object of my invention to provide an improved electric valve converting system for transmitting energy between direct current circuits in which the output of the system is controlled in accordance with increases in the constant current voltage.

The novel features which I believe to be characteristic of my invention are set forth with particularity in the appended claims. My invention itself, however, both as to its organization and method of operation, together with further objects and advantages thereof, will be better understood by reference to the following description taken in connection with the accompanying drawing in which the single figure shows an electric valve converting system embodying my invention which is suitable for transferring energy between constant potential and constant current direct current circuits.

Referring now more particularly to the single figure of the drawing, there is illustrated an arrangement embodying my invention for transferring energy from a constant potential circuit 10, which may be a high voltage trolley system, and a constant current direct current circuit 11 which supplies energy to an inductive load comprising a plurality of motors 12. This system is provided with an energy storage and transfer device comprising a three-legged magnetic core structure 13 indicated in the drawing by a dotted line rectangle. Each of the legs 14, 15 and 16 of the core structure 13 is provided with a pair of inductive windings 17, 18; 19, 20; 21, 22, each pair of inductive windings being provided with energy storage devices which may be in the form of the capacitors 23, 24 and 25. These capacitors 23, 24 and 25 may be connected in parallel with the inductive windings 17, 19 and 21, respectively, or at least across portions thereof, so as to form energy storage circuits. One terminal of each of the inductive windings 17, 19 and 21 is connected through an inductor 26 and a circuit breaker 27 to one side of the direct current circuit 10. One terminal of each of the inductive windings 18, 20 and 22 is connected through an inductor 28 to one side of the direct current circuit 11. An electric valve apparatus 29 provides a controlled electric discharge path for each of the inductive windings 17 to 22, inclusive. While electric valve apparatus 29 is shown as being of the single cathode-multianode type, this electric valve apparatus may be any of the several types well known in the art, although it is preferable to utilize electric valves of the type containing an ionizable medium and which are provided with a control or starting electrode whereby the discharge paths between the anodes and cathodes may be controlled. In the arrangement shown, each of the inductive windings 17 to 22 is connected to a different one of the anodes 30 to 35, respectively, of the electric valve apparatus 29, the cathode of which is connected to both direct current circuits 10 and 11. The control electrodes of the anodes 30, 32 and 34 are controlled from a source of alternating current comprising an alternating current generator 36 through a phase shifting device 37, and the primary and secondary windings 38 and 39 of a delta to star-connected control transformer. The remaining control electrodes of the anodes 31, 33 and 35 are energized from the same source of alternating current 36 through the primary and secondary windings 40 and 41 of another delta to star-connected control transformer. The midpoint of the secondary winding 41 is connected directly to the cathode of the electric valve apparatus 29, whereas the midpoint of the secondary winding 39 is connected through a resistor 42 to the cathode of the apparatus 29. The purpose of the resistor 42 will become apparent in the description of the operation of the system. The alternating current generator 36 is driven by a motor 43 which may be energized from a suitable source of direct current 44. The direct current motor 43 is provided with two fields 45 and 46. The field 45 is arranged in shunt relation to the armature through resistors 47 and 48. The resistor 47 may be adjustable so that the normal speed of the motor 43 may be determined thereby. A pair of conductors 49 are connected across the direct current circuit 11 and supply energy through the contacts of a relay 50 to the field winding 46 of the motor 43. The resistor 48 may be short circuited through the contacts of a relay 51. The relays 50 and 51 are connected in series to be energized from a controller which may be any of the types commonly used in controlling electric locomotives. A conductor 52 is connected between the negative side of the direct current circuit 44 and one terminal of the resistor 42. The other terminal of the resistor 42 is connected to one of the contacts of each of the relays 53 and 54. The relay 53 is connected across the conductors 49 and is so arranged as to operate in response to a predetermined voltage appearing across the direct current circuit 11. The relay 54 is arranged to be energized from the same controller which controls the energization of the relays 50 and 51. The operation of either of the relays 53 or 54 serves to connect by means of conductor 55 the positive terminal of the direct current circuit 44 to one side of the resistor 42, thereby placing a high negative bias upon the control electrodes of the anodes 30, 32 and 34. This negative bias is sufficient to prevent the alternating current supplied from the generator 36 through the phase shifter and the transformer windings 38 and 39 from rendering these electric discharge paths conductive.

The operation of the electric valve converting system will first be described without reference to the sequence of operations which may be provided by the relays of the control circuit. In operation, neglecting leakage reactance between the windings associated with each leg of the core structure 13, the windings and capacitors associated therewith serve to maintain the total magnetomotive force in that of each of the legs of the magnetic core structure 13 at a substantially constant value. Each of the electric discharge paths of the anodes 30 to 35 and the cathode of the electric valve apparatus 29 is conductive for 120 electrical degrees of each cycle, these discharge paths becoming conductive in a predetermined sequence at a frequency equal to that of the alternating current supplied by the alternating current generator 36. In order to operate this system properly, the phase relation between the grid excitation of the valves 30, 32 and 34 and the valves 31, 33 and 35 must be such that the valve connected to the winding of the constant current circuit becomes conductive in advance of the valve connected to the corresponding winding associated with the constant potential circuit. This angle of advance between the excitation of the two corresponding discharge paths or valves, as for example between the anodes 30 and 31, will lie between any value just greater than zero and slightly less than 180 degrees. The phase shifting device 37 provides the necessary means for obtaining this phase difference and also can be used as a control for determining the amount of energy transferred between the two direct current circuits. In general, the voltage relation and power transfer relation between the two direct current circuits is dependent upon the ratio between each pair of windings on each leg of the core structure 13; the size of the capacitors 23 to 25, the phase relation between the excitation of the groups of control electrodes for the anodes 30, 32, 34 and 31, 33, 35, and the frequency of the alternating current potential applied to the control electrodes of the various anodes as derived from the alternating current generator 36. The functions performed in the operation of the system by the three-legged core structure 13, the windings 17, 19, 21 and the associated capacitors 23, 24 and 25 perhaps will be clarified by the following example of one cycle of operation of the electric discharge paths between the anodes 30 and 31 and the cathode of the electric valve apparatus 29. If we assume, for example, that the grid excitation supplied to the control electrodes of the anodes 30 and 31 differs by a phase difference of 120 degrees, the anode 31 will be conductive for 120 electrical degrees, while the anode 30 remains nonconductive. It is assumed that the capacitor 23 has been charged to a certain potential by a previous operation, and that this now discharges into the winding 17 so that by magnetic coupling with the winding 18 energy is supplied to the anode 31. At the end of the period of conductivity of the anode 31, the anode 30 becomes conductive and the anode 31 now remains nonconductive for 240 degrees. Thus the current transmitted by the anode 30 serves to store energy in the capacitor 23 during the period of conductivity of this anode. At the end of the period of conductivity of this anode 30, the current is transferred from this anode to one of the other anodes 32 or 34 and during the next 120 electrical degrees the anodes 30 and 31 both become nonconductive. During the period when both these anodes are nonconductive, the capacitor 23 discharges into the transformer winding 17 in order to maintain the required magnetomotive force in this transformer winding and in so doing the electrical charge of the capacitor reverses in polarity so that it now has the proper polarity to supply power to the anode 31 when this anode is again permitted to become conductive. From this it is believed that it will be apparent to those skilled in the art that the capacitors 23, 24 and 25 not only provide commutating potentials to cause the transfer of current between the anodes 30, 32 and 34, but also operate as energy storage devices to supply current to the anodes 31, 33 and 35.

The operation as provided by the relays 50, 51, 53 and 54 and a suitable controller will now be described. If it is assumed that the electric locomotive is at a standstill, the initial operation of the controller will connect all of the motors 12 in series relation across the direct current circuit 11. In order to obtain a high starting torque for the motors, energy must be supplied to the control electrodes of the anodes 30, 32 and 34 at a frequency higher than normal operation would require. The initial adjustment of the controller causes the relay 54 to open its contacts, thereby removing the high negative bias from the control electrodes of the anodes 30, 32 and 34, permitting them to become energized from the alternating current generator 36. Initial operation of the controller also causes relay 50 to close its contacts, thereby connecting the field winding 46 across the direct current circuit 11, and the relay 51 to open its contacts, thereby inserting the resistor 48 in series with the field winding 46 which causes the field to be weakened, thereby resulting in an increased speed of the motor 43. For the purpose of explanation, it may be assumed that the motor now speeds to approximately five times normal speed so that it comprises an alternating current having a frequency five times that of the normal frequency upon the grids of all of the anodes, and hence the output current of the converting system will be increased from for example, an original value of 40 per cent to a value of 200 per cent. If this high frequency of the alternating current generator 36 were to be maintained, the electric valve converting system would deliver a constant current of 200 per cent as the voltage on the motors 12 increased. In order to prevent this voltage from rising above a safe value, the field supplied by the field winding 46 from the direct current circuit 11 operates in response to voltage increases of this circuit 11 to decrease the operating speed of the motor 43. The result is that the motors 12 come up to speed and as they do so the frequency of the alternating current generator 36 decreases so that at normal speed of the series connected motors 12, the electric valve converting apparatus operates at the desired normal rating. Whenever the voltage across the direct current circuit 11 reaches a predetermined amount, which may be assumed to be a normal voltage for this circuit, the relay 53 operates to close its contacts and to connect the direct current source 44 across the resistor 42, thereby preventing the anodes 30, 32 and 34 from conducting. Thus the motorman of the locomotive will then shift his controller to the next position which connects the motors 12 in series-parallel relation and again the same sequence of operation of the relays 50, 51 and 54 occurs, so that for this series-parallel connection a high output is obtained across the direct current circuit 11 which decreases as the motors 12 come to their new speed value. When this new speed value is reached, the voltage across the direct current circuit 11 will again be such that the relay 53 will operate, thereby indicating to the motorman that the controller should be moved to a new position which will connect all of the motors 12 in parallel. Again the relays and the direct current motor 43 operate in a similar sequence until the voltage across the direct current circuit 11 increases to such a point as to cause the relay 53 to operate. The relay 53 will now continue to operate to open and close its contacts, thereby maintaining the voltage across the direct current circuit 11 within certain predetermined limits. If it is desired to stop the locomotive or reduce its speed, any retroactive movement of the controller will cause the relay 54 to operate, thereby preventing the anodes 30, 32 and 34 from becoming conductive.

While I have shown and described my invention in connection with certain specific embodiments it will, of course, be understood that I do not wish to be limited thereto, since it is apparent that the principles herein disclosed are susceptible of numerous other applications, and modifications may be made in the circuit arrangements and in the instrumentalities employed without departing from the spirit and scope of my invention, as set forth in the appended claims.

What I claim as new and desire to secure by Letters Patent of the United States, is,—

1. In an electric valve converting system for transferring energy between a constant potential direct current source and a constant current load circuit comprising an energy storage and transfer device provided with a plurality of controlled electric discharge paths, the method which comprises initially rendering conductive said electric discharge paths at a relatively high frequency and subsequently reducing the frequency at which said electric discharge paths are rendered conductive in accordance with an electrical condition of said constant current circuit.

2. In an electric valve converting system for transferring energy between a constant potential direct current source and a constant current load circuit comprising an energy storage and transfer device provided with a plurality of controlled electric discharge paths, the method which comprises initially rendering conductive said electric discharge paths at a relatively high frequency, subsequently reducing said frequency at which said electric discharge paths are rendered conductive in accordance with an electrical condition of said constant current circuit, and rendering said electric valve converting system non-conductive in accordance with a predetermined electrical condition of said constant current circuit.

3. In an electric valve converting system for transferring energy from a source of constant potential direct current to a plurality of load devices comprising a controlled electric valve converting system for converting direct current of constant potential to constant current direct current, the method which comprises arranging said load devices in series relation across said constant current circuit, initially rendering conductive said electric valve converting system at a relatively high frequency, and subsequently reducing the frequency of the conductivities of said electric valve converting system proportionately to increases in an electrical quantity in said load circuit.

4. In an electric valve converting system for transferring energy from a source of constant potential direct current to a plurality of load devices comprising a controlled electric valve converting system for converting direct current of constant potential to constant current direct current, the method which comprises arranging said load devices in a predetermined relation with respect to said constant current circuit, initially rendering conductive said electric valve converting system at a relatively high frequency, reducing the frequency of the conductivities of said electric valve system proportionately to increases in the voltage appearing across said load devices until a predetermined value is obtained, thereupon rearranging said load devices in a different circuit relationship with respect to said constant current circuit, rendering conductive said electric valve converting system at a relatively high frequency, and reducing the frequency of the conductivities of said electric valve converting system proportionately to increases in an electrical quantity appearing in said load circuit until a predetermined value is obtained.

5. In an electric valve converting system for transferring energy from a source of constant potential direct current to a plurality of load devices comprising a controlled electric valve converting system for converting direct current of constant potential to constant current direct current, the method which comprises arranging all of said devices in series relation across said constant current circuit, initially rendering conductive said electric valve converting system at a relatively high frequency, reducing the frequency of the conductivities of said electric valve converting system proportionately to increases in an electrical quantity in said load circuit until a predetermined value is obtained, rearranging said load devices in series-parallel relationship, rendering conductive said electric valve converting system at a relatively high frequency, reducing the frequency of the conductivities of said electric valve converting system proportionately to increases in an electrical quantity appearing in said load circuit until a predetermined value is obtained, rearranging said load devices in parallel circuit arrangement, rendering conductive said electric valve converting system at a relatively high frequency, reducing the frequency of the conductivities of said electric valve converting system proportionately to an electrical quantity appearing in said load circuit until a predetermined value is obtained, and rendering non-conductive said electric valve converting system whenever a predetermined electrical condition of said circuit is obtained.

6. An electric valve converting system for transferring energy between constant potential and constant current direct current circuits comprising an $n$-legged core structure having a pair of windings on each leg, an energy storage device for each leg associated with one of the windings thereon, an electric discharge means providing a controlled electric discharge path for each of said windings, means for interconnecting one of the windings on each of said legs together with its associated electric discharge path to one of said direct current circuits and means for connecting the other of said windings on each of said legs together with its associated electric discharge path to the other of said direct current circuits, a control circuit for said electric discharge paths, means for supplying energy to said control circuit comprising a source of alternating current variable in frequency, and means responsive to the voltage across said constant current direct current circuit for reducing the frequency of said alternating current source in proportion to an increase in said constant current voltage.

7. An electric valve converting system for transferring energy between constant potential and constant current direct current circuits comprising a polyphase core structure having two groups of inductive windings, a plurality of energy storage devices associated with one group of said windings, electric discharge apparatus providing a controlled electric discharge path for each of said windings, means for connecting one group of windings together with its associated electric discharge paths across one of said direct current circuits, means for connecting said other group of windings together with its associated electric discharge paths across another of said direct current circuits, a control circuit for said electric discharge paths, a source of alternating current for said control circuit, means for causing said source to operate initially at a high frequency, and means responsive to the voltage across said constant current direct current circuit for reducing the frequency of said alternating current source in accordance with increases in voltage in said circuit.

8. An electric valve converting system for transferring energy from a constant potential direct current source to a constant current direct current circuit comprising an $n$-legged energy storage and transfer device having a pair of windings on each leg thereof, electric discharge apparatus providing a controlled electric discharge path for each of said windings, means interconnecting one of said windings of each leg together with its associated electric discharge path to one of said direct current circuits, means interconnecting the remaining windings with their associated electric discharge paths with the other of said direct current circuits, a control circuit for said electric discharge paths, a source of alternating current variable in frequency for energizing said control circuit, means for supplying to said control circuit alternating current having a relatively high frequency, means responsive to the voltage of said constant current circuit for reducing the frequency of said alternating current in accordance with increases in load voltage in said direct current circuit, and means responsive to a predetermined voltage of said alternating current circuit for rendering non-conductive said electric discharge apparatus.

9. An electric valve converting system for transferring energy between a high potential-constant potential direct current circuit and a low potential constant current circuit comprising an $n$-legged energy storage and transfer device provided with a plurality of windings on each of the legs thereof, electric valve apparatus providing a controlled electric discharge path for each of said windings, means for connecting one of the windings together with its associated electric discharge path to said constant potential circuit, means for connecting the remaining windings together with their associated electric discharge paths to said constant current circuit, a control circuit for said electric discharge paths, an alternating current generator for supplying current to said control circuit, an electric motor for driving said alternating current generator, means for supplying field excitation to said electric motor, means for initially reducing the field supplied to said electric motor, and means responsive to the voltage of said constant current direct current circuit for subsequently controlling the field excitation of said motor.

10. An electric valve converting system for supplying constant current direct current to an inductive load from a constant potential direct current source of energy comprising a multi-legged energy storage and transfer device having a pair of windings on each of the legs thereof, electric discharge apparatus providing a controlled electric discharge path for each of said windings, means for interconnecting one of the windings on each of said legs together with their associated electric discharge paths to one of said direct current circuits, means for interconnecting the remaining windings and their associated electric discharge paths with the other of said direct current circuits, a control circuit for said electric discharge paths, an alternating current generator for energizing said control circuit, a motor for driving said alternating current generator, said motor being provided with two field windings, means for supplying energy to one of said field windings, means for reducing the energy normally supplied to said field winding, and means interconnecting said other field winding so as to be energized from said constant current circuit.

CARL C. HERSKIND.